(12) United States Patent
Ducourant

(10) Patent No.: US 6,885,397 B1
(45) Date of Patent: Apr. 26, 2005

(54) METHOD FOR CORRECTING NOISE LEVEL IN A DIGITIZED IMAGE DETECTOR

(75) Inventor: Thierry Ducourant, Voiron (FR)

(73) Assignee: Trixell S.A.S., Moirans (FR)

( * ) Notice: Subject to any disclaimer, the term of this patent is extended or adjusted under 35 U.S.C. 154(b) by 0 days.

(21) Appl. No.: 09/555,517

(22) PCT Filed: Dec. 4, 1998

(86) PCT No.: PCT/FR98/02627

§ 371 (c)(1),
(2), (4) Date: Jun. 7, 2000

(87) PCT Pub. No.: WO99/30279

PCT Pub. Date: Jun. 17, 1999

(30) Foreign Application Priority Data

Dec. 9, 1997 (FR) .......................................... 97 15554

(51) Int. Cl.$^7$ ................................................ H04N 9/64
(52) U.S. Cl. ...................................... 348/243; 348/245
(58) Field of Search ................................ 348/243, 245, 348/246; 358/463

(56) References Cited

U.S. PATENT DOCUMENTS

| | | | | |
|---|---|---|---|---|
| 4,602,291 A | * | 7/1986 | Temes .......................... | 348/243 |
| 4,785,353 A | * | 11/1988 | Seim ........................... | 348/241 |
| 5,493,334 A | * | 2/1996 | Zortea et al. ................ | 348/243 |
| 5,777,495 A | | 7/1998 | Arques et al. | |
| 5,973,327 A | | 10/1999 | Moy et al. | |

OTHER PUBLICATIONS

U.S. Appl. No. 09/555,517, filed Jun. 7, 2000, pending.
U.S. Appl. No. 09/736,121, filed Dec. 15, 2000, pending.
U.S. Appl. No. 09/926,834, filed Dec. 28, 2001, pending.
U.S. Appl. No. 10/149,451, filed Jun. 27, 2002, pending.
U.S. Appl. No. 10/168,522, filed Jun. 28, 2002, pending.

\* cited by examiner

*Primary Examiner*—Andrew Christensen
*Assistant Examiner*—Brian Genco
(74) *Attorney, Agent, or Firm*—Oblon, Spivak, McClelland, Maier & Neustadt, P.C.

(57) ABSTRACT

A process for correcting noise level of an image detector including photosensitive points arranged in rows and in columns. Within each row, the points are distributed into detector points and into corrector points. The detector points deliver a measurement value dependent on a luminous cue to which they are exposed. The corrector points deliver a dark value serving in the correction of the measurement values. Within at least one row, the detector points are distributed into at least two groups and the measurement values are corrected with a first or a second correction value depending on the group from which they originate. Such a process may find application to digitized-image detectors.

12 Claims, 1 Drawing Sheet

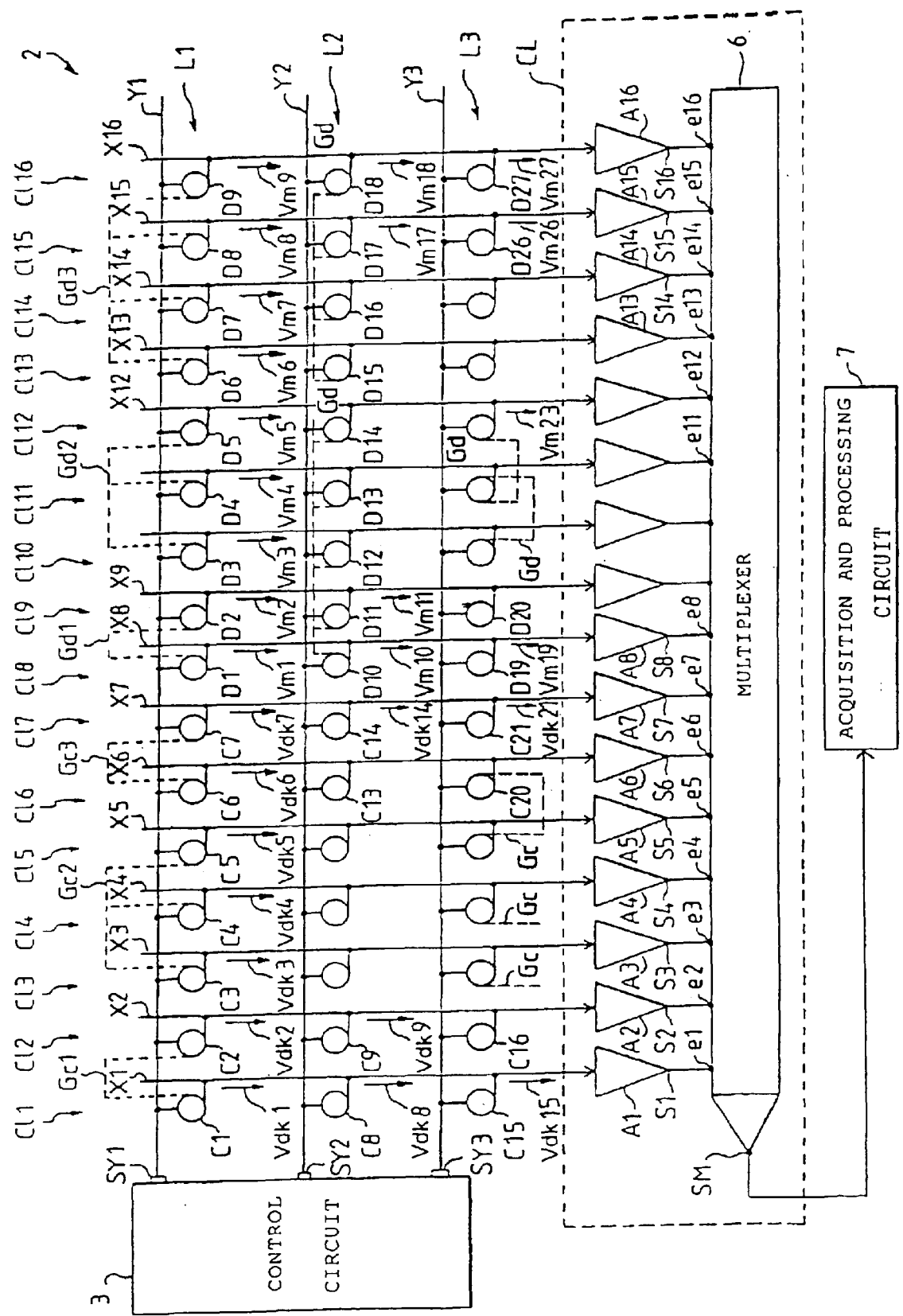

METHOD FOR CORRECTING NOISE LEVEL IN A DIGITIZED IMAGE DETECTOR

BACKGROUND OF THE INVENTION

1. Field of the Invention

The present invention relates to a process for correcting noise level. It applies to image detectors of the type in which the acquisition of the images is performed by a matrix of photosensitive points. The process of the invention is more particularly aimed at reducing the perception of noise which is correlated between all the photosensitive points of one and the same row.

2. Discussion of the Background

Matrices of photosensitive points are commonly used in image acquisition techniques, where they make it possible to obtain digitized images. In these photosensitive matrices, the photosensitive points are produced in particular with the aid of techniques for depositing thin films of semiconductor materials. These photosensitive matrices make it possible to detect images contained in visible or near-visible radiation. It should be noted that they find a particularly beneficial application in the detection of radiographic images; to this end, it is sufficient to interpose a scintillator screen between the incident X-rays and the photosensitive matrix, so as to convert the X-rays into radiation within the band of wavelengths to which the photosensitive points are sensitive.

There are photosensitive matrices of large dimensions (for example 50 cm×50 cm), which may have up to several million photosensitive points or pixels. The photosensitive points form a network of rows and columns. A photosensitive matrix, of the type in which each photosensitive point comprises a photodiode cooperating with an interrupter element consisting of a switching diode, is described with its mode of operation as well as an embodiment thereof, in a French patent application No. 86/14058 (publication No. 2,605,116).

When the matrix is exposed to a luminous cue, quantities of charges are generated and accumulated by each of the photosensitive points, as a function of the intensity of the signal to which it has been exposed. Reading of these quantities of charges is carried out row by row. It consists in particular initially in transporting the charges accumulated by each of the photosensitive points of the row addressed, to columnwise reading circuits, by way of conductors parallel to the columns. Thereafter, multiplexing circuits then make it possible to transfer these quantities of charge, in the form of measurement values, to a data acquisition circuit where they are stored and processed.

Generally regardless of the mode of operation of the matrix, each measurement value is overlaid with a noise level, the origin of which is in particular the noise affecting the various electronic facilities involved in the reading, in particular the row addressing circuits and the columnwise reading circuits.

The term "noise" is understood to mean that the measurement value Vm, delivered by each photosensitive point, can only be reproduced with a certain error or statistical fluctuation characterized by its standard deviation.

It is well known that in image detectors of the type with photosensitive matrix, a non-zero noise density at frequencies below the row addressing frequency (the row frequency is the inverse of the time allocated to the reading of the photosensitive points of one and the same row), results in all the photosensitive points of this row being affected by the same noise: this noise is then referred to as "row-wise correlated noise" Bcl.

It is also well known that the eye is especially effective in detecting all the correlated phenomena in am image. This renders the row-wise correlated noise Bcl especially formidable since it is detectable even at very low levels. It is generally considered that, relative to uncorrelated noise Bnc whose level corresponds to the limit of perception by the eye, correlated noise Bcl is still perfectly detectable by the eye when it possesses a level of the order of 10 times lower than that of the uncorrelated noise.

To this problem which results from the rise in the capacity of perception of the eye to correlated fluctuations, a conventional solution is afforded by a noise correction method referred to as the "clamp" technique; in this method, the value VBcl of the correlated noise Bcl present in a given row is determined so as to subtract it from the measurement value Vm delivered by each of the photosensitive points of this row (Vm−Vbcl). For this purpose, this method consists in particular in reading a so-called dark value Vdk (which contains the row-wise correlated noise), delivered by a photosensitive point belonging to the row and deliberately left in the dark. This is achieved by protecting the photosensitive point from any exposure to a luminous cue; this point thus fulfills solely a correction function and it is referred to as a "corrector point" in the subsequent description. The other photosensitive points intended to be exposed to luminous cues with a view to detecting an image are referred to as "detector points".

However, if the dark value Vdk of such a photosensitive point actually contains the cue of the row-wise correlated noise Bcl, it also possesses a certain level of uncorrelated noise Bnc; the dark value Vdk is in fact the quadratic sum of the correlated noise Bcl and uncorrelated noise Bnc. Additionally, with a view to providing a correction value exhibiting a reduced level of uncorrelated noise Bnc, more than one corrector point, i.e. n corrector points, are allocated to the function for correcting the row-wise correlated noise Bcl. Under these conditions, a correction value Vc obtained ultimately by averaging the dark values Vdk of these n corrector points is representative of the correlated noise level Bcl, whilst the larger the number n of corrector points, the greater will have been the statistical reduction in the uncorrelated noise Bnc. More precisely, the uncorrelated residual noise level is reduced by a factor equal to the root of the number n of corrector points (Vc=Bcl+Bnc/√n).

When the measurement value VM of each of the detector points of the row is corrected by the correction value Vc, the original row-wise correlated noise Bcl is eliminated, but it is replaced with some other noise Bcl' injected through the correction itself. This noise Bcl' is the uncorrelated residual noise which itself becomes row-wise correlated through the very fact that it is present in all the detector points. This new row-wise correlated noise Bcl' therefore has an amplitude equal to that of the uncorrelated residual noise, i.e. Bnc/√n. Under these conditions, if one wishes to confer on this new correlated noise Bcl' a level below that at which it is perceived, while complying with the rule according to which a correlated noise must be less than at least 10 times the uncorrelated noise, we must have √n=10, and hence n=100 (n being the number of corrector points of the row).

This solution produces good results when [sic] to the perception of noise by the eye, but it is extremely penalizing on account of the high number n (n>100) of corrector points which it requires for each row. Indeed, the high number of corrector points not only increases the cost, but it increases the bulk for one and the same area intended for image detection, since for each row, these 100 corrector detectors must be left in the dark.

SUMMARY OF THE INVENTION

The aim of the present invention is to reduce or even to do away with the perception by the eye of the row-wise correlated noise in an image detector. It proposes that the measurement values delivered by the detector points be corrected in a manner such that it makes it possible, for one and the same perception by the eye, to obtain the values required for these corrections with a number of corrector points which is considerably reduced relative to the prior art.

According to the invention, a process for correcting noise level in an image detector comprising a matrix of photosensitive points arranged in at least one row and in at least one column, the photosensitive points being in each row distributed, on the one hand into so-called "detector" points each intended to be exposed to a luminous cue and to deliver a measurement value which is dependent on the intensity of the luminous cue, and distributed on the other hand into so-called "corrector" points each intended to deliver a so-called "dark" value serving in a correction of the measurement values, the image detector furthermore comprising a so-called acquisition and processing circuit into which are transferred the measurement values and the dark values and in which is performed the correction of each of the measurement values, the process being characterized in that for at least one row, it consists in correcting the measurement values with at least two different correction values [sic].

One thus tends, by subjecting the detector points of one and the same row to different noise corrections, to destroy or as it were "sever" the correlation of the noise between the detector points of the row. It follows that the formulation of the corrector values need no longer, as in the known art, be carried out with the aid of a number n of corrector point which is sufficient to comply with the rule that the correlated noise be less than at least 10 times the uncorrelated noise.

BRIEF DESCRIPTION OF THE DRAWING

The invention will be better understood on reading the description which follows, by way of non-limiting example, with reference to the single appended FIGURE which represents diagrammatically an image detector allowing the implementation of the process of the invention.

DESCRIPTION OF THE PREFERRED EMBODIMENTS

The FIGURE diagrammatically represents an image detector to which the process of the invention can be applied. The image detector comprises a photosensitive matrix 2, itself comprising conductors Y1 to Y3 (so-called "row conductors") arranged in rows, crossed with conductors X1 to X16 (so-called "column conductors") arranged in columns. To each crossover of a row conductor Y1 to Y3 and of a column conductor X1 to X16 there corresponds a photosensitive point (labelled either D1 to D27 or C1 to C21 depending on its function), connected in a conventional manner between the row conductor and the column conductor. The photosensitive points D1 to D27, C1 to C21 are thus arranged as rows L1 to L3 and columns C11 to C116.

The precise makeup of the photosensitive points D1 to D27, C1 to C21 not being useful in the understanding of the invention, they are symbolized in the FIGURE by a circle; it should however be noted that these photosensitive points may be made up in a conventional manner, in particular of a photodiode cooperating with an interrupter element of the transistor type, or else of the switching diode type as for example described in the French patent application (publication No. 2,605,166) cited earlier.

The photosensitive points D1 to D27, C1 to C21 are all identical, however they are distributed into two categories having different functions. The photosensitive points of the first category are referred to as "detector points" D1 to D27, and they are intended for detecting an image: they must each be exposed to a luminous signal whose intensity is dependent on the content of the image, and each deliver a measurement value Vm1 to Vm27 corresponding to this intensity.

The photosensitive points of the second category are referred to as "corrector points" C1 to C21, and they must each deliver a noise-related cue referred to as the dark value Vdk1 to Vdk21 and used to correct the measurement values Vm1 to Vm27 of the noise by which these latter are affected. For this purpose, it is conventional to protect the corrector points C1 to C21 from any exposure to a luminous signal, with the aid for example of an opaque screen (not represented). It is then simpler to group all the corrector points C1 to C21 on one and the same side of the matrix 2, as in the non-limiting example shown in the FIGURE, where in each row L1 to L3, seven detector points C1 to C21 are all placed on the left, and are followed by nine detector points D1 to D27.

In the example of the FIGURE and in order to simplify the latter, only 3 row conductors and 16 column conductors are represented, but of course the invention can equally well be applied in the case of a matrix having a much larger or smaller capacity. It is common for example to make matrices having photosensitive points arranged as for example around 2000 rows and around 2000 columns, or else arranged as a single row and several columns so as to constitute a detection strip, or else arranged as a single row and a single column so as to constitute a single photosensitive point.

The image detector comprises a control circuit 3, whose outputs SY1, SY2, SY3 are respectively linked to the row conductors Y1, Y2, Y3. The control circuit 3 comprises various elements (not represented), such as for example, clock circuit, switching elements, shift register, enabling it in particular to carry out sequential addressing of the row conductors Y1 to Y3.

In conventional manner, the column conductors X1 to X3 are each linked to an integrator amplifier A1 to A16 belonging to a reading circuit CL. The outputs S1 to S16 of the integrator amplifiers are linked to the parallel inputs e1 to e16 of a multiplexer 6, which is formed for example by a shift register with parallel inputs and serial output which can be of the C.C.D type (the abbreviation standing for Charge Coupled Device). The output Sm of the multiplexer 6 is linked to a so-called "acquisition and processing" circuit 7 responsible in particular for the acquisition, storage and processing of the results of the reading of the photosensitive points.

This conventional arrangement makes it possible, in the course of a reading phase which occurs after a phase of exposure of the detector points D1 to D27 to a luminous signal, to deliver "in series" and row after row (L1 to L3), as output SM from the multiplexer 6, a series of dark values Vdk1 to Vdk21 provided by the corrector points C1 to C21, followed by a series of measurement values Vm1 to Vm27 provided by the detector points D1 to D27.

Thus, by taking for example the first row L1 of photosensitive points, when this row L1 is addressed, on the one hand dark values Vdk1 to Vdk7 delivered respectively by the corrector points C1 to C7, and on the other hand measurement values Vm1 to Vm9 delivered respectively by the detector points D1 to D9, are applied to the inputs e1 to e16 of the multiplexer 6. The latter then transfers these values to the acquisition circuit 7 in the form of voltage signals delivered in series, beginning for example with, the dark values from the first Vdk1 (provided by the first corrector point C1) up to the seventh Vdk7 (originating from the seventh corrector point C7); this dark value Vdk7 is followed by the measurement values, from the first Vm1 up to the ninth measurement value Vm9. The same operation is repeated for the second row L2 and then for the third row L3.

When the measurement and correction values of a row L1 to L3 are transferred into the acquisition circuit 7, the latter can process them, in particular to perform a correction of the noise.

In the prior art, as mentioned earlier, a noise correction value Vc is formulated on the basis of the dark values Vdk each provided by one of the n corrector points of the row. The correction value Vc is obtained by averaging the n dark values, and the noise correction consists in subtracting this single correction value Vc from the measurement value Vm delivered by each of the detector points.

With the process of the invention, on the contrary, the noise correction is not performed with one and the same correction value for all the detector points of one and the same row. The noise correction in accordance with the process of the invention consists, on the one hand, in distributing the detector points D1 to D27 of at least one row L1 to L3, into at least two groups referred to as "detector groups" Gd1, Gd2; it consists on the other hand in formulating at least two different correction values Vc1, Vc2 on the basis of the n corrector points C1 to C21 of this same row; and finally it consists in correcting the measurement values originating from the detector points belonging to one of the detector groups Gd1, Gd2 by one of the correction values Vc1, Vc2, and in correcting the measurement values originating from the detector points belonging to the other detector group by the other correction value.

A first embodiment of the invention, illustrated in the first row L1 (by dashed lines connecting the detector points and corrector points of one and the same group), can consist in distributing the N detector points D1 to D7 of the row into a number M of detector groups Gd1, Gd2, Gd3, formed respectively by different numbers N1, N2, N3 of detector points D1 to D7. In the example of the FIGURE where, for sufficient clarity of the latter, the number of detector and corrector points is necessarily limited: the total number N of detector points in a row L1 to L3 being equal to 7, in the first row L1, the number M of detector groups is equal to 3 and the numbers N1, N2, N3 of detectors in a group equal to 2, 3 and 4 respectively.

Of course in practice, in the case for example of rows containing a number N of detector points of the order of 2000, the number M of detector groups can be increased so as to sufficiently destroy the noise correlation between the detector points of the row. Trials have shown that in such a case, that a division of the line into around 10 detector groups was already amply sufficient to "sever" the correlation so that it is no longer perceived as annoying to the eye: the number of detector points in this case can lie for example between 50 and 300; this number may or may not be the same in all the detector groups, and it may even be different between all the detector groups.

In the example represented in the first row L1, the first and the second detector points D1, D2 serve to form the first detector group Gd1; the second detector group Gd2 is formed by the third, fourth and fifth detector points D3, D4, D5; the third detector group Gd3 is formed by the sixth, seventh, eighth and ninth detector points D6, D7, D8 and D9.

The n corrector points C1 to C7 of the first row L1 are also distributed into a number m of groups referred to as "corrector groups" Gc1, Gc2, Gc3 (m=3 in the non-limiting example represented), which are formed respectively in the non-limiting example described by a number n1=2, n2=3, n3=2 of corrector points.

It should be observed that this division into detector groups and corrector groups of the detector and corrector points D1 to D9 and C1 to C7, is not in fact manifested in any way at the level of these points themselves, but that it results from the processing of the measurement values Vm1 to Vm27 which is envisaged in respect of the noise correction, which processing is executed at the level of the acquisition and processing circuit 7. Hereinbelow, the grouping of these points as represented in the FIGURE, is merely to illustrate the implementation of the correction process according to the invention.

Hence, according to the example illustrated by the first row L1, this processing consists in averaging the dark values Vdk1, Vdk2 delivered respectively by the first and second corrector points C1, C2 (which form a first corrector group Gc1), to form with this average a first correction value Vc1. A second correction value Vc2 is obtained by averaging the dark values Vdk3, Vdk4, Vdk5 respectively delivered by the third, fourth and fifth corrector points C3, C4 and C5, which form a second corrector group Gc2. Finally, a third correction value Vc3 is obtained by averaging the dark values Vdk6, Vdk7, respectively delivered by the sixth and seventh corrector points C6, C7 which form a third corrector group Gc3. It should be noted that given the statistical fluctuations affecting each of the dark values, the smaller the number of dark values on the basis of which each of the correction values Vc1 to Vc3 will have been obtained, the more different from one another these correction values thus obtained may be.

The first correction value Vc1 is selected for correcting the measurement values originating from the detector points belonging to one and the same detector group, the first detector group Gd1 for example: this first correction value therefore serves for correcting the measurement values Vm1 and Vm2 delivered by the detector points D1, D2. The same holds for the measurement values Vm3, Vm4, Vm5 originating from the second detector group Gd2, which are corrected by the second correction value Vc2, and the same holds for the measurement values Vm6 to Vm9, originating from the third detector group Gd3 and which are corrected by the third correction value Vc3.

It is thus possible in practice to appreciably reduce as compared with the prior art, to 20 for example, the number of detector points which within a row are necessary for the noise correction. In the example illustrated in the first row L1 in fact, to each detector group Gd1 to Gd3 there corresponds a corrector group Gc1 to Gc3, and if this example were applied to the case cited above in which the detector points of a row are distributed into 10 detector groups, it would also be necessary to make 10 corrector groups: by assuming then that each corrector group is formed by two detector points, the row would have to contain 20 detector points. This should be compared, for the same optical perception by the eye, with the 100 detector points which, in the prior art, are required within a row to correct the noise.

Of course, the fact that the correction values Vc1 to Vc3 are obtained with lower numbers n1, n2, n3 of corrector points than the number n of these corrector points present in a row L1 to L3, slightly increases the level of noise injected into the matrix 2 and therefore creates additional noise. For this reason it may be preferable (but not obligatory) to use at least two corrector points C1 to C21 per corrector group Gc1 to Gc3, rather than just one; however, even a single corrector point forming a corrector group is still an interesting solution, since because this additional noise is no longer correlated, its effect is added only quadratically, and in most cases it is negligible.

A corrector group Gc1 to Gc3 can also serve to correct the values provided by two or more detector groups Gd1 to Gd3, thereby making it possible either to further reduce the number of corrector points C1 to C21 within each row L1 to L3, or to increase the number n1, n2, n3 of these corrector points within each of the corrector groups Gc1 to Gc3, or just some of these groups. In fact, it is not obligatory for the various corrector groups Gc1 to Gc3 to be formed by one and the same number n1, n2, n3 of corrector points, one at least of these groups can comprise a different number n2 of them from the others, such as the group Gc2 in the example illustrated in the first row L1; that is to say, the number of corrector points C1 to C7 in a corrector group Gc1 to Gc3 can be one or more, and this number may or may not be the same in all the corrector groups of a row, or else be different between all the corrector groups of a row.

The noise correction explained hereinabove with reference to the first row L1 can be applied in the same manner to the other rows L2, L3. However, it is also possible to introduce one or more variant; from one row to another. For example, the selection of one of the corrector groups Gc1 to Gc3 so as to correct any one of the detector groups Gd1 to Gd3 can be made random in a row and/or from row to row L1 to L3.

In the example shown in the first row L1, the detector groups Gd1 to Gd3 form distinct blocks, but it is also possible to nest the detector groups, that is to say to mingle one or more detector groups belonging to a given detector group, with detector points belonging to one or more other detector groups. In such a case, by considering the second row L2 for example, the detector point D13 (situated in column C111) could belong to a different detector group from that to which the detector points D12 and D14, situated immediately to each side of it, belong.

Another efficacious variant can consist for example in making the value of the number M of detector groups and/or of the number m of corrector groups vary from row to row L1 to L3.

Finally, another variant consists in varying, or in modifying the distribution of the number of detector points d1 to d27 in the detector groups Gd1 to Gd3, from row to row L1 to L3.

What is claimed is:

1. A process for correcting noise level in an image detector, the image detector comprising:

a matrix of photosensitive points arranged in at least one row and at least one column, a first number of the photosensitive points forming detector groups configured to be exposed to a luminous cue and to provide first measurement values of an intensity of the luminous cue and a second number of the photosensitive points forming corrector groups configured not to be exposed to the luminous cue and to provide second measurement values corresponding to a dark value to correct the first measurement values; and an acquisition and processing circuit configured to accept the first and second measurement values and to perform correction of the first measurement values based on the second measurement values, the process comprising:

distributing on at least one row at least two detector groups and at least two corrector groups; and correcting the first measurement values with the second measurement values for each of the at least two detector groups.

2. The process according to claim 1, wherein a number of detector groups is equal to a number of corrector groups.

3. The process according to claim 1 wherein the first measurement values are corrected using one of the second measurement values.

4. The process according to claim 1, wherein at least two corrector groups include a same number of photosensitive points.

5. The process according to claim 1, wherein at least two corrector groups include a different number of photosensitive points.

6. The process according to claim 1, wherein at least one corrector group includes one photosensitive point.

7. The process according to claim 1, wherein at least two detector groups in a row include a same number of photosensitive points.

8. The process according to claim 1, wherein at least two detector groups include a different number of photosensitive points.

9. The process according to claim 1, wherein at least one photosensitive point from a first detector group is included in a second detector group.

10. The process according to claim 1, wherein a first row includes a first number of detector groups that is different from a second number of detector groups in a second row.

11. The process according to claim 1, wherein a first row includes at least one detector group having a first number of photosensitive points and a second row includes at least one detector group having a second number of photosensitive points that is different from the first number of photosensitive points.

12. The process according to claim 1, wherein at least one of the first measurement values is corrected with a correction value randomly selected from the second measurement values.

* * * * *